US005907862A

United States Patent [19]
Smalley

[11] Patent Number: 5,907,862
[45] Date of Patent: May 25, 1999

[54] METHOD AND APPARATUS FOR THE SHARING OF A MEMORY DEVICE BY MULTIPLE PROCESSORS

[75] Inventor: Kenneth George Smalley, Hauppauge, N.Y.

[73] Assignee: Standard Microsystems Corp., Hauppauge, N.Y.

[21] Appl. No.: 08/683,547

[22] Filed: Jul. 16, 1996

[51] Int. Cl.⁶ ........................................................ G06F 9/46
[52] U.S. Cl. .......................................... 711/163; 711/151
[58] Field of Search .............................. 364/228.1, 242.6, 364/230, 238.4, 228.3, 243, 229.2, 242.91, 243.41; 395/490, 478; 711/163, 151, 150, 152, 211, 147

[56] References Cited

U.S. PATENT DOCUMENTS

| | | | |
|---|---|---|---|
| 4,009,470 | 2/1977 | Danilenko et al. | 395/478 |
| 4,282,572 | 8/1981 | Moore, III et al. | 395/478 |
| 4,539,656 | 9/1985 | Abrant | 711/211 |
| 4,549,273 | 10/1985 | Tin | 711/150 |
| 4,698,753 | 10/1987 | Hubbins et al. | 395/200.39 |
| 4,803,618 | 2/1989 | Ita et al. | 711/147 |
| 5,202,887 | 4/1993 | Ueno et al. | 395/182.06 |
| 5,265,223 | 11/1993 | Brockmann et al. | 395/303 |
| 5,408,627 | 4/1995 | Stirk et al. | 395/478 |
| 5,524,255 | 6/1996 | Beard et al. | 395/800 |

OTHER PUBLICATIONS

O'Krafka et al., "An Empirical Evaluation of Two Memory-Efficient Directory Methods", IEEE, p. 139, paragraph 9, 1990.

*Primary Examiner*—Tod R. Swann
*Assistant Examiner*—Felix B. Lee
*Attorney, Agent, or Firm*—Proskauer Rose LLP

[57] ABSTRACT

A method and apparatus for controlling the access of multiple processors to a shared memory device in a computer or other processor-based system. An exemplary embodiment includes an embedded processor and a host processor, both of which share access to a single-port random access memory (RAM). An access control circuit is provided which includes a control register with a first storage element corresponding to the embedded processor and a second storage element corresponding to the host processor. The access control circuit utilizes access request bits stored in the first and second storage elements to generate a select signal which is applied to the select signal inputs of a group of multiplexers. The multiplexers select either the embedded processor or host processor control, address and data signal lines for connection to the single-port RAM. The access control circuit is configured such that the first processor to successfully set the access request bit in its corresponding storage element is granted temporary exclusive access to the RAM. The storage elements are interconnected such that the output of a given element drives a reset input of the other element. Once a given processor sets its access request bit and is thereby granted access to the shared RAM, the storage element interconnection prevents the other processor from setting its access request bit until the given processor relinquishes control of the RAM.

18 Claims, 3 Drawing Sheets

METHOD AND APPARATUS FOR THE SHARING OF A MEMORY DEVICE BY MULTIPLE PROCESSORS

FIELD OF THE INVENTION

The present invention relates generally to memory access techniques for use in processor-based circuits and systems. More particularly, the invention relates to techniques for sharing a single-port random access memory (RAM) or other memory device between multiple processors.

BACKGROUND OF THE INVENTION

Many computers and other types of processing systems require the use of multiple independent processors. For example, a conventional desktop or portable personal computer (PC) will often include both a host processor and a multifunction controller. A typical multifunction controller may include several independent controllers, such as a floppy disk controller, one or more serial port controllers, a parallel port controller, and a keyboard/mouse interface controller, as well as other components such as an embedded microprocessor, a single-port random access memory (RAM), a host processor interface and a real time clock (RTC). The embedded microprocessor directs the operation of one or more of the controllers, and may also provide power management and other functions for the system in which the multifunction controller is installed. A computer system with a host processor and a multifunction controller having an embedded microprocessor thus represents one example of a multiple independent processor system.

The multiple independent processors in such a system often need to access a shared memory device. For example, in the case of the multifunction controller previously described, both the host processor and the embedded microprocessor may need to access the single-port RAM. A problem arises in that the single-port RAM has only a single processor interface, and therefore only one of the host or embedded processors can access the RAM at any given time. Conventional memory-sharing techniques attempt to solve this problem by allocating the single-port RAM to either the host processor or the embedded processor on a first-come, first-served basis rather than in accordance with any particular need-based protocol. Another approach may involve utilizing a dual-port RAM in place of the single-port RAM such that both processors have a separate interface into the RAM. However, these conventional approaches are inadequate in that neither processor is given exclusive and independent control of the RAM at any particular time. In addition, there is generally no automatic lock-out protection provided to ensure that one processor will not attempt to access the RAM while the other processor is using it.

As is apparent from the above, a need exists for improved memory-sharing techniques for use in multiple-processor systems. The improved techniques should provide a simple and efficient sharing mechanism which allows a particular processor to obtain exclusive control of the shared memory device for a particular period of time, and thereby minimizes the likelihood of interference with another system processor.

SUMMARY OF THE INVENTION

The present invention provides a method and apparatus for controlling access of multiple processors to a shared memory device. An exemplary embodiment includes an embedded processor and a host processor, both of which share access to a single-port random access memory (RAM). An access control circuit is provided which includes a control register with a first storage element corresponding to the embedded processor and a second storage element corresponding to the host processor. The access control circuit utilizes access request bits stored in the first and second storage elements to generate a select signal which is applied to the select signal inputs of a group of multiplexers. The multiplexers select either the embedded processor or host processor control, address and data signal lines for connection to the single-port RAM. The access control circuit is configured such that the first processor to successfully set the access request bit in its corresponding storage element is granted temporary exclusive access to the RAM. The storage elements are interconnected such that the output of a given element drives a reset input of the other element. Once a given processor sets its access request bit and is thereby granted access to the shared RAM, the storage element interconnection prevents the other processor from setting its access request bit until the given processor relinquishes control of the RAM.

In accordance with one aspect of the invention, a method is provided which includes the steps of attempting to store for a given one of a plurality of processors a predetermined value in a given one of a corresponding plurality of control register storage elements; reading the contents of the given storage element; and allowing the given processor to access the memory device if the contents read from the given storage element correspond to the predetermined value. The control register storage elements may be single-bit storage elements. Each of the plurality of processors may be permitted to read all of the control register storage elements, but can write to only its particular corresponding storage element. The first processor which is able to successfully write the predetermined value to its corresponding storage element is granted temporary exclusive access to the shared memory device. The storage elements may be interconnected such that if any one of the elements contains the predetermined value, indicating that the corresponding processor has been granted access to the shared memory, all other storage elements are held in a reset state to prevent the other processors from storing the predetermined value. The other processors will again be eligible to access the shared memory after the processor accessing the memory relinquishes control by clearing its corresponding storage element.

In accordance with another aspect of the invention, an apparatus is provided for controlling the access of a plurality of processors to a shared memory device. The apparatus includes a group of multiplexers having processor signal inputs coupled to control, address and data signal lines of the plurality of processors and an output corresponding to signal lines of a selected one of the plurality of processors which has been granted access to the shared memory device. An access control circuit has an output coupled to a select signal input of the multiplexer, and includes a control register with a storage element corresponding to each of the plurality of processors. The access control circuit is operative to provide a select signal to the multiplexer indicating which of the plurality of processors has been granted access to the memory device by successfully storing a predetermined value in its corresponding control register storage element.

The present invention allows multiple processors to share a single-port RAM or other memory device while avoiding the interference problems and other complications inherent in the prior art techniques. A memory-sharing protocol in accordance with the invention ensures that a given processor obtains a temporary exclusive access to the shared memory device, and that its access will not be interfered with by any other processor. Once the given processor relinquishes its access to the shared memory, all of the multiple processors may again attempt to gain access. The memory-sharing protocol may be implemented in computers and other processor-based systems using relatively simple multiplexing and control register circuitry.

DETAILED DESCRIPTION OF THE INVENTION

The present invention will be illustrated below in conjunction with an exemplary processing system which includes a host processor. The exemplary system also includes an embedded microprocessor which may be part of a multifunction controller or other application-specific integrated circuit (ASIC). It should be understood, however, that the invention is more broadly applicable to memory sharing in numerous alternative applications. For example, the memory sharing techniques described herein may be used in any processor-based system in which two or more processors need to access a common memory device. In addition, although the invention is illustrated using a single-port random access memory (RAM) as the shared memory device, it will be readily apparent to those skilled in the art that the described techniques are also suitable for use with other types of memory devices.

Figure 1:
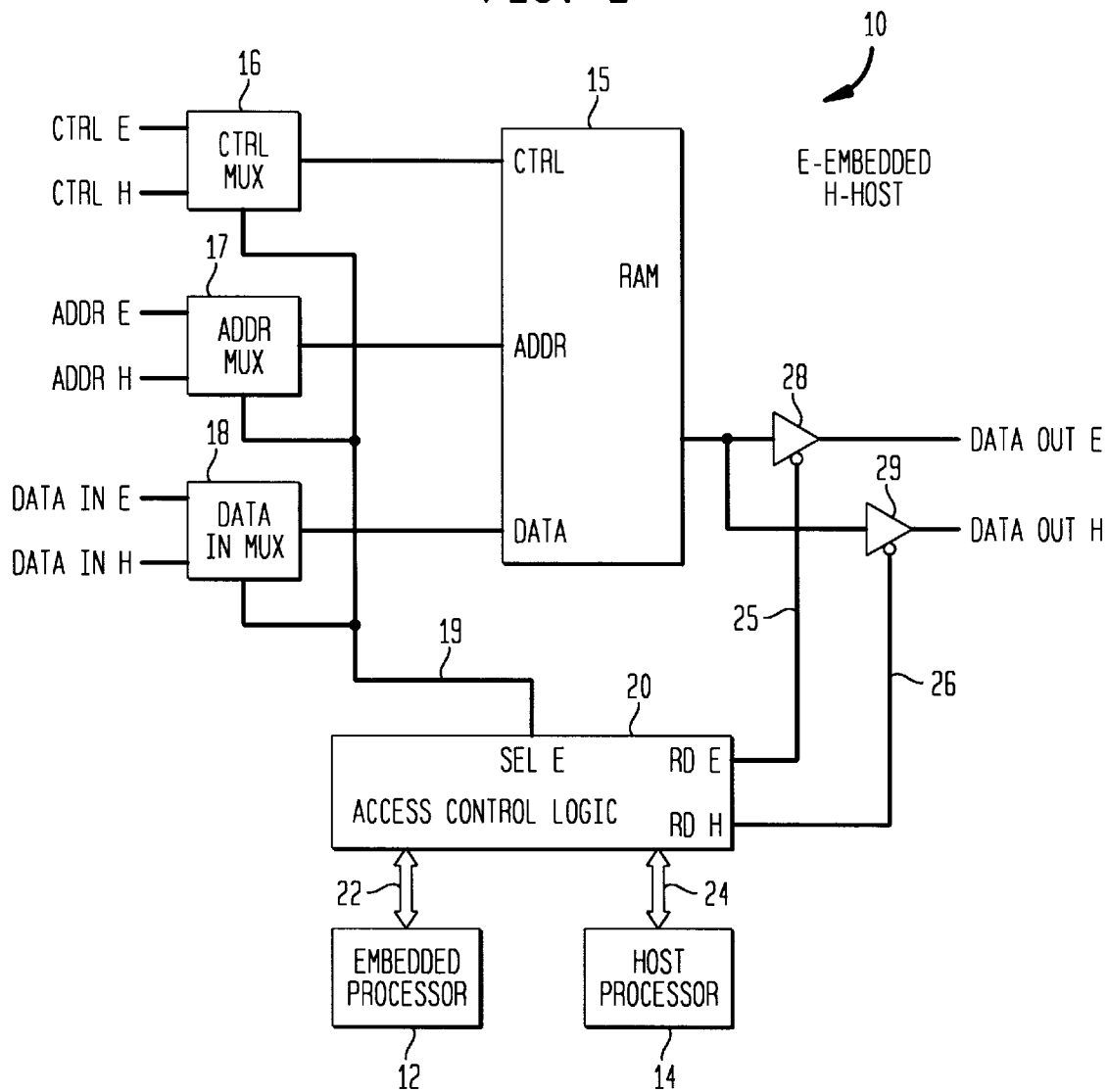
FIG. 1 is a block diagram of an exemplary system which implements a memory-sharing protocol in accordance with the present invention.

FIG. 1 is a block diagram of an exemplary processing system 10 which includes memory sharing features in accordance with the present invention. The system 10 may represent a portion of a personal computer (PC) or a portion of another type of processing system. For purposes of the present description, it will be assumed that the system 10 is a portion of a PC. The system 10 includes an embedded processor 12, a host processor 14 and a single-port static RAM 15. The embedded microprocessor 12 and RAM 15 may be part of a multifunction controller installed within the PC, while the host processor corresponds to the primary PC microprocessor. In an exemplary multifunction controller, the embedded processor 12 is an 8051 8-bit microprocessor of the type available from Intel and the single-port RAM is a 128-byte static memory device. As noted above, other types of processors and memory devices could be used in alternative embodiments.

The system 10 further includes a control multiplexer 16, an address multiplexer 17 and a data multiplexer 18. An access control logic circuit 20 determines whether the embedded (E) processor 12 or the host (H) processor 14 will control the RAM 15. The access control logic circuit 20 supplies a select signal SEL E to the multiplexers 16, 17 and 18 via line 19. The select signal SEL E determines whether the control, address and data input signals supplied to the RAM 15 from the multiplexers 16, 17 and 18 will be from the embedded processor 12 or the host processor 14. Typical control signals supplied to the RAM 15 in the system of FIG. 1 may include read control, write control, chip enable and output enable signals. As will be described in greater detail below, the access control logic circuit 20 is designed in accordance with the invention to avoid undesired activation of the RAM control signals when switching RAM access between the embedded and host processors, and thus preserves the data integrity of the RAM during the switching operation.

The access control logic circuit 20 communicates with the embedded processor 12 via an embedded processor interface 22 and with the host processor 14 via a host processor interface 24. The access control circuit 20 also provides read enable signals RD E and RD H on lines 25, 26, respectively. The signals RD E and RD H determine whether the output of the RAM 15 will be driven via buffer 28 onto the data bus of the embedded processor 12 or via buffer 29 onto the data bus of the host processor 14. Although in this exemplary embodiment the RAM 15 has separate data input and data output lines, the memory-sharing techniques of the present invention are also applicable to memory devices with common input/output data lines.

Figure 2:
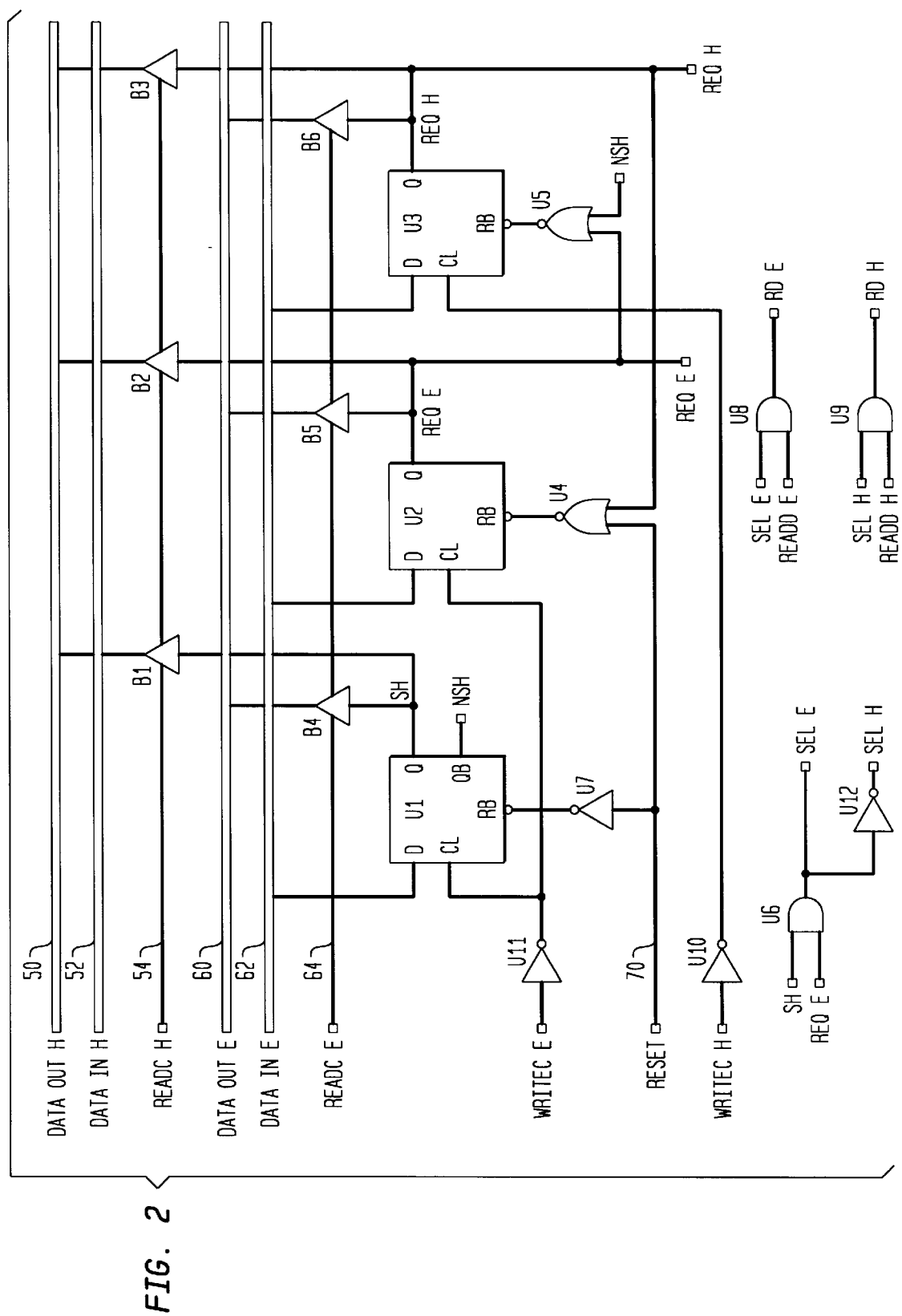
FIG. 2 is a schematic diagram of an access control logic circuit suitable for use in the system of FIG. 1.

FIG. 2 is a schematic diagram of an exemplary implementation of the access control logic circuit 20 in accordance with the present invention. The circuit 20 includes a shared access control register which in this embodiment comprises D-type flip-flops U1, U2 and U3. The control register stores three bits which control the memory-sharing protocol of the present invention in a manner to be described in greater detail below. These bits are a "Smart Host" (SH) bit stored in U1, an embedded processor access request bit (REQ E) stored in U2 and a host processor access request bit (REQ H) stored in U3. The host processor 14 accesses the control register via a DATA OUT H bus 50 and a DATA IN H bus 52. The host processor 14 can read the SH, REQ E and REQ H bits from the control register flip-flops U1, U2 and U3 by activating the READC H control signal on line 54. This enables the output buffers B1, B2 and B3 such that the contents of the control register flip-flops U1, U2 and U3 are driven onto the host processor DATA OUT H bus 50. The host processor 14 is able to write the REQ H bit to flip-flop U3 by activating the WRITEC H control signal which is applied via inverter U10 to the clock input of the flip-flop U3. Activation of the WRITEC H control signal causes a REQ H value supplied on the host processor DATA IN H bus 52 to be loaded into the flip-flop U3, provided U3 is not held in a reset mode by a high REQ E bit or a low SH bit supplied to the reset input of U3 via NOR gate U5.

The embedded processor 12 accesses the control register flip-flops U1, U2 and U3 via a DATA OUT E bus 60 and a DATA IN E bus 62. The embedded processor 12 can read the SH, REQ E and REQ H bits from the control register flip-flops U1, U2 and U3 by activating the READC E control signal on line 64. This enables the output buffers B4, B5 and B6 such that the contents of the control register flip-flops U1, U2 and U3 are driven onto the embedded processor DATA OUT E bus 60. The embedded processor 12 is able to write the SH and REQ E bits to flip-flops U1 and U2, respectively, by activating the WRITEC E control signal which is applied via inverter U11 to the clock inputs of the flip-flops U1 and U2. Activation of the WRITEC E control signal causes SH and REQ E values supplied on the embedded processor DATA IN E bus 62 to be loaded into the control register flip-flops U1 and U2. The U2 flip-flop will not be written if U2 is held in a reset mode by a high REQ H bit supplied to the reset input of U2 via NOR gate U4. The SH, REQ E and REQ H bits stored in control register flip-flops U1, U2 and U3 may be reset during a system initialization by a reset signal applied to line 70. The reset signal on line 70 is applied via an inverter U7 to the reset input of U1, and via NOR gates U4 and U5 to the reset inputs of U2 and U3, respectively.

The SH bit stored in flip-flop U1 of the access control register of FIG. 2 determines whether or not the memory-sharing protocol of the present invention is enabled. If the SH bit is not set, the memory-sharing protocol is not enabled and only the host processor 14 is permitted to access the RAM 15. This feature of the invention is useful in applications in which the host processor 14 is executing code which is unaware of the memory-sharing protocol and thus assumes that the host processor has exclusive control of the RAM 15. If the embedded processor 12 were to take control of the RAM 15 in such a situation, the data integrity of the RAM 15 could be compromised. This is because the host processor 14 would be unaware that the embedded processor may have changed the RAM contents. As noted above, the SH bit stored in flip-flop U1 is controlled by the WRITEC E signal applied to the clock input of U1 via inverter U11 and the data value supplied on the DATA IN E bus 62.

If the SH bit is set, the memory-sharing protocol is enabled and both the embedded processor 12 and the host processor 14 may request control of the RAM 15 by attempting to set the REQ E and REQ H bits, respectively. As noted above, the flip-flop U2 storing the REQ E bit is writable only by the embedded processor 12 via the WRITEC E signal, and the flip-flop U3 storing the REQ H bit is writable only by the host processor 14 via the WRITEC H signal. Both the REQ E and REQ H bits may be read by both the embedded and host processors at any time so that these processors may determine if a particular processor already has control of the RAM 15. The embedded processor 12 requests control of the RAM 15 by attempting to write a logic "1" to flip-flop U2 and then reading back the contents of U2 to determine if the REQ E bit was set by the write operation. If the REQ E bit is read back as a "1", then the RAM 15 is controlled by the embedded processor 12. The host processor 14 requests control of the RAM 15 by attempting to write a logic "1" to flip-flop U3 and then reading back the contents of U3 to determine if the REQ H bit was set by the write operation. If the REQ H bit is read back as a "1", then the RAM 15 is controlled by the host processor 14.

The access control logic circuit of FIG. 2 is configured such that only one of the REQ E or REQ H bits can be set at given time. In addition, once either the REQ E or REQ H bit is set, it must be cleared before the other processor can take control of the RAM 15. The circuit of FIG. 2 uses NOR gates U4 and U5 to ensure that only one of the request bits is set at a time. The REQ H bit stored in U3 is applied via NOR gate U4 to the reset input of U2, such that if REQ H is set it will hold U2 cleared and prevent the setting of the REQ E bit. Similarly, the REQ E bit stored in U2 is applied via NOR gate U5 to the reset input of U3, such that if REQ E is set it will hold U3 cleared and prevent the setting of the REQ H bit. As noted above, gates U4, U5 and U7 also ensure that the REQ E, REQ H and SH bits are reset during a system initialization. TABLE 1 below shows the relationship between the values of the control register bits SH, REQ E and REQ H and the processor which controls the RAM 15. The value "X" designates a "don't care" value.

TABLE 1

| SH | REQ E | REQ H | PROCESSOR |
|---|---|---|---|
| 0 | X | X | HOST |
| 1 | 0 | 0 | NONE |
| 1 | 1 | 0 | EMBEDDED |
| 1 | 0 | 1 | HOST |

The access control logic circuit of FIG. 2 includes an AND gate U6 which receives as its inputs the SH bit stored in U1, and the REQ E bit stored in U2. If the SH bit is not set, the AND gate U6 in conjunction with inverter U12 forces the select signal SEL E to a logic "0" level. The SEL E signal is applied to the select signal inputs of the multiplexers 16, 17 and 18 of FIG. 1 such that the multiplexers are automatically configured to pass the host processor control, address and data input signals to the RAM 15. If the SH and REQ E bits are set, the select signal SEL E is at a logic "1" level, which causes the multiplexers 16, 17 and 18 to pass the embedded processor control, address and input data signals to the RAM 15. If the SH and REQ H bits are set, the select signal SEL E is at a logic "0" level, which causes the multiplexers 16, 17 and 18 to pass the host processor control, address and input data signals to the RAM 15. The gate U6 in conjunction with a non-set SH bit serves to override the REQ E and REQ H bits stored in the control register and to select automatically the host processor interface to the RAM 15.

The access control logic circuit of FIG. 2 also includes AND gates U8 and U9 which serve to generate the output read enable signals RD E and RD H. These enable signals RD E and RD H drive the respective enable inputs of the buffers 28, 29 as shown in FIG. 1. The AND gate U8 receives as its input the signals SEL E and READD E. If both of these input signals are at a logic "1" level, the buffer 28 is enabled to supply the data output from the RAM 15 to the embedded processor 12. The AND gate U9 receives the signals SEL H and READD H, where SEL H is the complement of SEL E as provided by inverter U12. The output of U9 is therefore at a logic "0" when the output of U8 is at a logic "1", such that the buffer 29 is not enabled when the buffer 28 is enabled. If both SEL H and READD H are at a logic "1" level, the output of U9 is at a logic "1" level and the buffer 29 is enabled to supply the data output from the RAM 15 to the host processor 12, while the buffer 28 is not enabled.

Figure 3B:
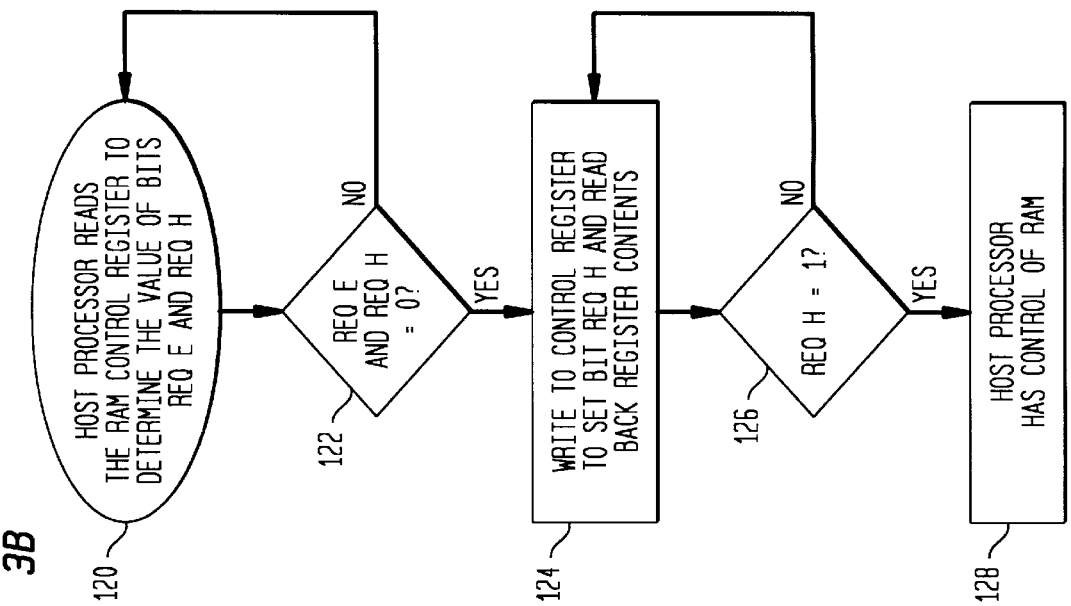
FIG. 3B is a flow diagram illustrating the manner in which a host processor accesses a shared memory device in accordance with the invention.
Figure 3A:
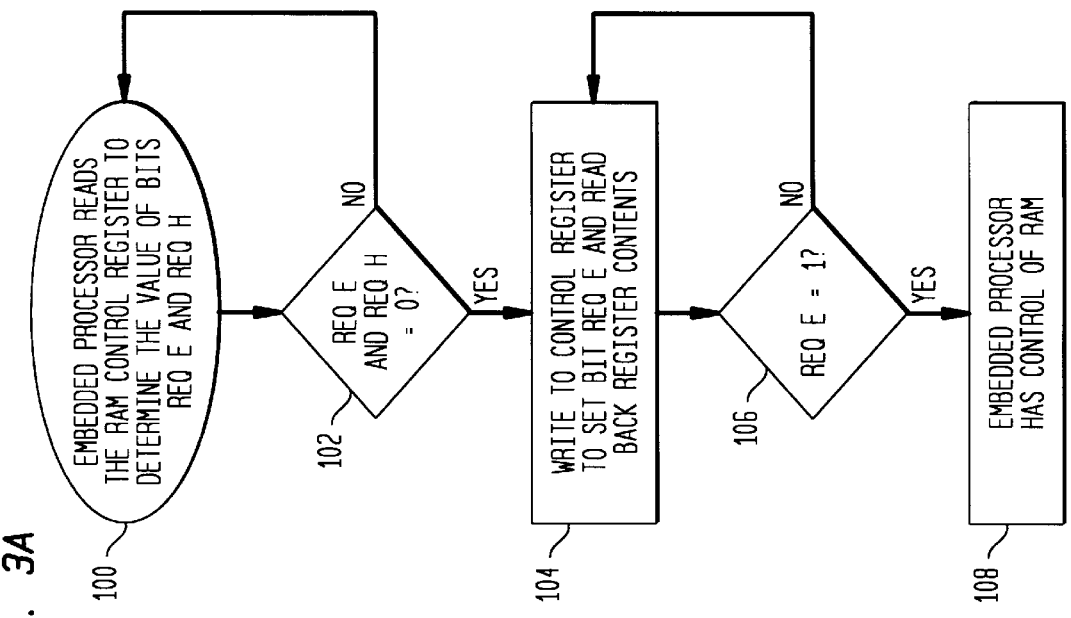
FIG. 3A is a flow diagram illustrating the manner in which an embedded processor accesses a shared memory device in accordance with the invention.

FIGS. 3A and 3B summarize the operation of the memory-sharing protocol implemented in system 10 of FIG. 1 using the exemplary access control logic circuit 20 of FIG. 2. The process steps shown assume that the SH bit is at a logic "1" level such that both the embedded processor 12 and the host processor 14 can attempt to access the RAM 15. FIG. 3A shows an exemplary set of steps performed by the embedded processor 12 in attempting to access the RAM 15. The embedded processor 12 in step 100 reads the contents of control register flip-flops U2 and U3 to determine the values of the REQ E and REQ H bits. In step 102, a determination is made as to whether both of these bits are a logic "0". If both bits are not a logic "0", this indicates that access to the RAM has already been granted to one of the processors. If the REQ E bit is set, the embedded processor has already been granted access to the RAM, and it can therefore proceed to access the RAM. If the REQ H bit is set, the host processor has already been granted access, and the embedded processor is temporarily prevented from accessing the RAM.

If both of the REQ E and REQ H bits are a logic "0", this indicates that neither processor has been granted exclusive control of the RAM. The embedded processor therefore attempts to write a "1" to the REQ E bit in the control register flip-flop U2, and then reads back the REQ E bit from U2 as shown in step 104. If the read-back REQ E bit is a "1", this indicates that the embedded processor has been granted access to the RAM 15 as shown in step 108. If the read-back REQ E bit is a "0", this indicates that the embedded processor was unable to obtain access to the RAM 15, and the process then returns to step 104. The embedded processor may have been unable to write a "1" to the REQ E bit because the host processor had meanwhile written a "1" to the REQ H bit, which as noted above would have the effect of forcing the REQ E bit to remain in a cleared state. In this exemplary embodiment, once a processor is granted access to the RAM, that processor retains exclusive control of the RAM until its access request bit is cleared. If the embedded processor is initially unable to obtain access, which indicates that the host processor has already been granted access, the embedded processor may periodically repeat steps 104 and 106 until after the host processor clears the REQ H bit and thereby allows the REQ E bit to be set.

FIG. 3B shows an exemplary set of steps performed by the host processor 14 in attempting to access the RAM 15. The host processor 14 in step 120 reads the contents of control register flip-flops U2 and U3 to determine the values of the REQ E and REQ H bits. In step 122, a determination is made as to whether both of these bits are a logic "0". If both bits are not a logic "0", this indicates that access to the RAM has already been granted to one of the processors. If the REQ H bit is set, the host processor has already been granted access to the RAM, and it can therefore proceed to access the RAM. If the REQ E bit is set, the embedded processor has been granted access, and the host processor is temporarily prevented from accessing the RAM.

As noted above, if both the REQ E and REQ H bits are a logic "0", this indicates that neither processor has been granted exclusive control of the RAM. The host processor therefore attempts to write a "1" to the REQ H bit in the control register flip-flop U3, and then reads back the REQ H bit from U3 as shown in step 124. If the read-back REQ H bit is a "1", this indicates that the host processor has been granted access to the RAM 15 as shown in step 128. If the read-back REQ H bit is a "0", this indicates that the host processor was unable to obtain access to the RAM 15, and the process then returns to step 124. The host processor may have been unable to write a "1" to the REQ H bit because the embedded processor had meanwhile written a "1" to the REQ E bit, which as noted above would have the effect of forcing the REQ H bit to remain in a cleared state. If the host processor is initially unable to obtain access, which indicates that the embedded processor has already been granted access, the host processor may periodically repeat steps 124 and 126 until after the embedded processor clears the REQ E bit and thereby allows the REQ H bit to be set.

The above-described memory access control techniques may be readily extended to applications with more than two processors by expanding the number of multiplexer inputs in the multiplexers 16, 17 and 18 of FIG. 1 and including an additional request bit storage element in the control register of FIG. 2 for each additional processor. For example, the system of FIG. 1 could be configured to allow four processors to access the RAM 15 by utilizing four-input multiplexers, four request bit storage elements, and appropriate logic circuitry to generate a two-bit select signal from the stored request bits.

It should be understood that the foregoing description is merely illustrative of the invention. Numerous alternative embodiments within the scope of the appended claims will be apparent to those of ordinary skill in the art.

What is claimed is:

1. A method of controlling the access of a plurality of processors to a shared memory device, the method comprising the steps of:

writing a respective single request bit from a given one of the plurality of processors to a respective one of a corresponding plurality of control register storage elements; each of said plurality of control register storage elements corresponding to a respective one of said plurality of processors, wherein the even processor being any of said plurality of processors requesting exclusive control of said shared memory device;

reading the contents of the respective storage element by the given processor; and allowing the given processor to access the shared memory device, if the single request bit read from the given storage element corresponds to the respective single request bit, without disabling said shared memory device, such that the given processor is granted exclusive access over said shared memory device based on said single request bit.

2. The method of claim 1 wherein the plurality of processors further includes a first processor which is a host processor in a computer and a second processor which is an embedded processor in a multifunction controller in the computer.

3. The method of claim 1 wherein the plurality of control register storage elements include one-bit storage elements, and the predetermined value is either a binary zero or a binary one.

4. The method of claim 1 further including the step of each of the processors reading the contents of each of the storage elements prior to the step of attempting to store a predetermined value, in order to determine if one of the plurality of processors has been granted access to the shared memory device.

5. The method of claim 1 wherein at least a subset of the storage elements are interconnected such that the storage of the predetermined value in the given one of the storage elements prevents other processors from storing predetermined values in corresponding storage elements of the subset.

6. The method of claim 1 wherein the step of storing a predetermined value further includes the steps of a first processor requesting access to the shared memory device by storing a predetermined value in a first storage element and a second processor requesting access to the shared memory device by storing a predetermined value in a second storage element.

7. The method of claim 6 further including the step of connecting an output of the first storage element to a reset input of the second storage element, such that if the first processor stores the predetermined value in the first storage element, the second processor will be prevented from storing the predetermined value in the second storage element.

8. The method of claim 6 further including the step of connecting an output of the second storage element to a reset input of the first storage element, such that the if the second processor stores the predetermined value in the second storage element, the first processor will be prevented from storing the predetermined value in the first storage element.

9. The method of claim 1, further comprising the step of selecting control, data and address lines of the given processor from respective control, data and address multiplexers if the single request bit read from the given storage element corresponds to the respective single request bit.

10. A controller circuit for controlling the access of a plurality of processors to a shared memory device, comprising:

a plurality of control register storage elements, each corresponding to a respective one of said plurality of processors, for storing a respective single request bit written from a given one of the plurality of processors, wherein the given processor being any of said plurality of processors requesting exclusive control of said shared memory device, wherein the bit stored in the respective storage element are read by the given processor, such that the given processor is allowed to access the shared memory device, if the single request bit read from the given storage element corresponds to the respective single request bit, without disabling said shared memory device, and such that the given processor is granted exclusive access over said shared memory device based on said single request bit.

11. The controller circuit of claim 10, further comprising:

at least one multiplexer having processor signal inputs coupled to control, data and address signal lines of the plurality of processors and an output corresponding to control, data and address signal lines of a selected one of the plurality of processors which has been granted exclusive access to the shared memory device.

12. The apparatus of claim 11 wherein the plurality of processors further includes a first processor which is a host processor in a computer system and a second processor which is an embedded processor in a multifunction controller in the computer system.

13. The apparatus of claim 11 wherein the plurality of control register storage elements include one-bit storage elements, and the predetermined value is either a binary zero or a binary one.

14. The apparatus of claim 11 wherein each of the plurality of processors is operative to read the contents of each of the storage elements prior to attempting to store the predetermined value, in order to determine if one of the plurality of processors has been granted access to the shared memory device.

15. The apparatus of claim 11 wherein at least a subset of the storage elements of the control register are interconnected such that the storage of the predetermined value in a given one of the storage elements prevents other processors from storing predetermined values in corresponding storage elements of the subset.

16. The apparatus of claim 11 wherein a first processor requests access to the shared memory device by storing a predetermined value in a first storage element of the control register and a second processor requests access to the shared memory device by storing a predetermined value in a second storage element.

17. The apparatus of claim 16 wherein an output of the first storage element is connected to a reset input of the second storage element, such that if the first processor stores the predetermined value in the first storage element, the second processor will be prevented from storing the predetermined value in the second storage element.

18. The apparatus of claim 16 wherein an output of the second storage element is connected to a reset input of the first storage element, such that if the second processor stores the predetermined value in the second storage element, the first processor will be prevented from storing the predetermined value in the first storage element.

* * * * *

UNITED STATES PATENT AND TRADEMARK OFFICE
CERTIFICATE OF CORRECTION

PATENT NO : 5,907,862
DATED      : May 25, 1999
INVENTOR(S): Kenneth George SMALLEY It is certified that error appears in the above-identified patent and that said Letters Patent is hereby corrected as shown below:

Column 1, line 37, remove "." after "single-port";

Column 8, line 14, "even" should read:
   --given--;

Column 8, line 62, "such that the if the second" should read:
   --such that if the second--.

Signed and Sealed this

First Day of February, 2000

Attest:

Attesting Officer

Q. TODD DICKINSON

Acting Commissioner of Patents and Trademarks